(12) United States Patent
Cooper et al.

(10) Patent No.: US 6,878,479 B2
(45) Date of Patent: Apr. 12, 2005

(54) TILTED FUEL CELL APPARATUS

(75) Inventors: John F. Cooper, Oakland, CA (US);
Nerine Cherepy, Oakland, CA (US);
Roger L. Krueger, Ripon, CA (US)

(73) Assignee: The Regents of the University of California, Oakland, CA (US)

( * ) Notice: Subject to any disclaimer, the term of this patent is extended or adjusted under 35 U.S.C. 154(b) by 490 days.

(21) Appl. No.: 10/170,879

(22) Filed: Jun. 12, 2002

(65) Prior Publication Data
US 2003/0017380 A1 Jan. 23, 2003

Related U.S. Application Data

(60) Provisional application No. 60/298,293, filed on Jun. 13, 2001.

(51) Int. Cl.[7] .............................................. H01M 2/14
(52) U.S. Cl. ............................ 429/38; 429/39; 429/34; 429/14; 429/16; 429/103
(58) Field of Search ............................ 429/14, 16, 103, 429/231.8, 231.9, 231.95, 38, 39, 34; 204/243.1

(56) References Cited

U.S. PATENT DOCUMENTS

| | | | | | |
|---|---|---|---|---|---|
| 4,065,375 A | * | 12/1977 | Newton | ..................... | 204/237 |
| 4,171,249 A | * | 10/1979 | Newton et al. | ............. | 205/348 |
| 4,511,441 A | * | 4/1985 | McIntyre et al. | ........... | 205/348 |
| 5,063,123 A | * | 11/1991 | Ohsuga et al. | ................. | 429/38 |
| 5,563,003 A | * | 10/1996 | Suzuki et al. | ................. | 429/14 |
| 5,897,972 A | * | 4/1999 | Hosaka | ....................... | 429/46 |
| 5,989,740 A | * | 11/1999 | Tomimatsu et al. | ........... | 429/16 |
| 6,187,467 B1 | * | 2/2001 | Zhang et al. | ................. | 429/42 |
| 6,200,697 B1 | | 3/2001 | Pesavento | | |
| 6,815,105 B2 | * | 11/2004 | Cooper et al. | ................ | 429/16 |

FOREIGN PATENT DOCUMENTS

WO    WO 99/52166    10/1999

* cited by examiner

Primary Examiner—Bruce F. Bell
(74) Attorney, Agent, or Firm—Ann M. Lee; Alan H. Thompson (57) ABSTRACT

Bipolar, tilted embodiments of high temperature, molten electrolyte electrochemical cells capable of directly converting carbon fuel to electrical energy are disclosed herein. The bipolar, tilted configurations minimize the electrical resistance between one cell and others connected in electrical series. The tilted configuration also allows continuous refueling of carbon fuel.

31 Claims, 9 Drawing Sheets

TILTED FUEL CELL APPARATUS

RELATED APPLICATIONS

This application is related to application Ser. No. 09/970,283 filed Sep. 27, 2001 entitled "Fuel Cell Apparatus and Method Thereof", and claims priority from Provisional Application No. 60/298,293 filed Jun. 13, 2001.

The United States Government has rights in this invention pursuant to Contract No. W-7405-ENG-48 between the United States Department of Energy and the University of California for the operation of Lawrence Livermore National Laboratory.

BACKGROUND

High temperature, molten electrolyte, electrochemical cells have been shown to be an efficient method of producing energy particularly when the fuel source is hydrogen gas. Carbon as a fuel source in electrochemical cells has been explored.

SUMMARY OF THE INVENTION

An aspect of the invention includes an apparatus comprising: an anode current collector; a cathode current collector; a porous ceramic separator, wherein the separator is sandwiched between the cathode current collector and the anode current collector and the anode current collector is at a higher elevation than the cathode current collector; an anode plate and rib assembly comprising a plate and a plurality of ribs, wherein the anode plate and rib assembly is positioned such that the ribs are electrically connected to the anode current collector to form a plurality of anode channels; a cathode plate and rib assembly comprising a plate and a plurality of ribs, wherein the cathode plate and rib assembly is positioned such that the ribs are electrically connected to the cathode current collector to form a plurality of cathode channels; means for entry to the anode channels of a plurality of particles, wherein the particles consist essentially of carbon, electrolyte, or mixtures thereof; means for entry of a gas containing both oxygen and carbon-dioxide to the cathode channels; means for exit of carbon dioxide gas and excess molten electrolyte from the anode channels; and means for exit of gaseous byproducts and excess molten electrolyte from the cathode channels, wherein the cell assembly is substantially planar and rectangular and tilted at an acute angle to the horizontal in a configuration such that the means of entry are positioned at a higher elevation than the means of exit and that the anode plate and rib assembly is positioned at a higher elevation than the cathode plate and rib assembly.

Another aspect of the invention includes An apparatus comprising: at least two bipolar, high temperature, molten electrolyte cell assemblies, wherein each cell assembly comprises: a porous ceramic separator; a cathode current collector; an anode current collector, wherein the separator is sandwiched between the cathode current collector and the anode current collector and the anode current collector is at a higher elevation than the cathode current collector; a cathode plate and rib assembly comprising a plate and a plurality of ribs, wherein the cathode plate and rib assembly is positioned such that the ribs are in contact with the cathode current collector and form a plurality of cathode channels; an anode plate and rib assembly comprising a plate and a plurality of ribs, wherein the anode plate and rib assembly is positioned such that the ribs are in contact with the anode current collector and form a plurality of anode channels; means for entry to the anode channels of a plurality of particles, wherein the particles consist essentially of carbon, electrolyte, or mixtures thereof; means for entry of a gas containing oxygen and carbon-dioxide to the cathode channels; means for exit of carbon dioxide gas from the anode channels; and means for exit of gaseous byproducts from the cathode channels, wherein the cell assembly is substantially planar and rectangular and tilted at an acute angle to the horizontal in a configuration such that the means of entry are positioned at a higher elevation than the means of exit; and wherein the cell assemblies are connected in electrical series.

A further aspect of the invention includes an apparatus comprising: (1) an anode compartment comprising (a) a plurality of anode plate and rib assemblies each comprising a plate and a plurality of ribs, (b) a plurality of anode channels, (c) a plurality of anode current collectors, wherein each anode plate and rib assembly is positioned such that the ribs are electrically connected to one anode current collector to form anode channels, (d) a means for entry to the anode channels of a plurality of particles, wherein the particles consist essentially of carbon, electrolyte, or mixtures thereof, and (e) a means for exit of carbon dioxide gas and excess molten electrolyte from the anode channels; (2) a cathode compartment comprising (a) a plurality of cathode plate and rib assemblies each comprising a plate and a plurality of ribs, (b) a plurality of cathode channels, (c) a plurality of cathode current collectors, wherein each cathode plate and rib assembly is positioned such that the ribs are electrically connected to one cathode current collector to form cathode channels, (d) a means for entry of an oxygen-containing gas to the cathode channels, and (e) a means for exit of gaseous byproducts from the cathode channels; (3) a plurality of porous ceramic separators, wherein each separator is sandwiched between one of the cathode current collectors and one of the anode current collectors to form a bipolar cell assembly, wherein the cell assemblies are connected in series and tilted at an acute angle to the horizontal such that the means of entry are at a higher elevation than the means of exit and the anode compartment is at a higher elevation than the cathode compartment; (4) an anode inlet manifold providing the means for entry of a plurality of particles to the anode channels; (5) an anode exhaust manifold providing the means for exit of the carbon dioxide and excess molten electrolyte from the anode channels, wherein the anode exhaust manifold communicates with a sump; (6) a cathode inlet manifold providing the means for entry of the oxygen-containing gas to the cathode channels; (7) a cathode exhaust manifold providing the means for exit of the gaseous byproducts and excess molten electrolyte from the cathode channels; and (8) a sump to collect the excess molten electrolyte.

BRIEF DESCRIPTION OF THE DRAWINGS

The accompanying drawings, which are incorporated into and form a part of the disclosure, illustrate embodiments of the invention and, together with the description, serve to explain the principles of the invention.

DETAILED DESCRIPTION OF THE EMBODIMENTS

Figure 1:
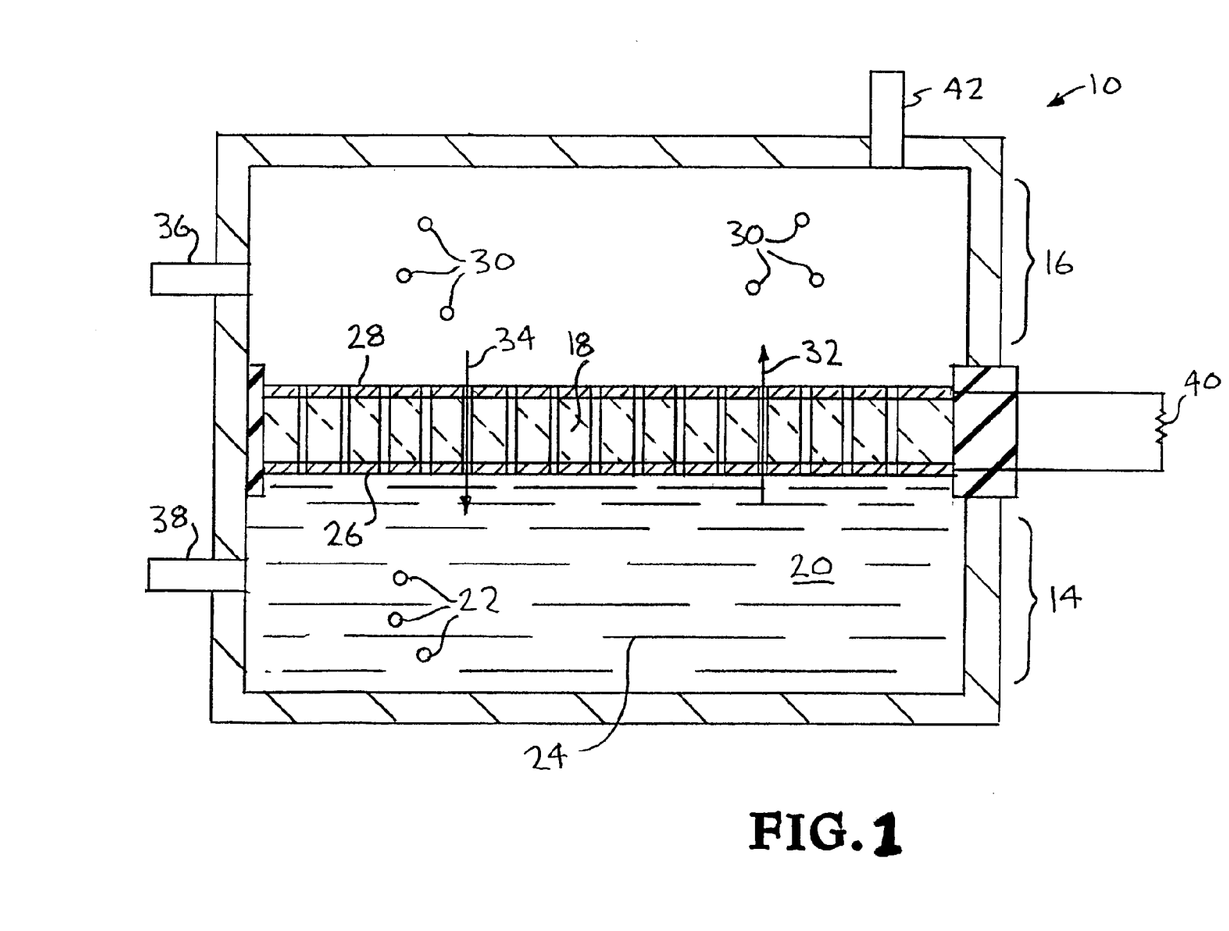
FIG. 1 is a cross-sectioned view of an embodiment of an electrochemical cell.
Figure 2A:
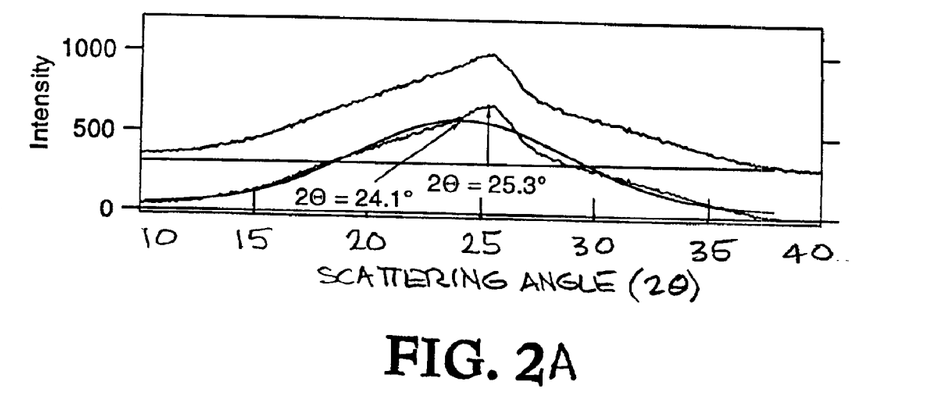
FIG. 2A is X-ray diffraction spectra of carbon sample A.
Figure 2B:
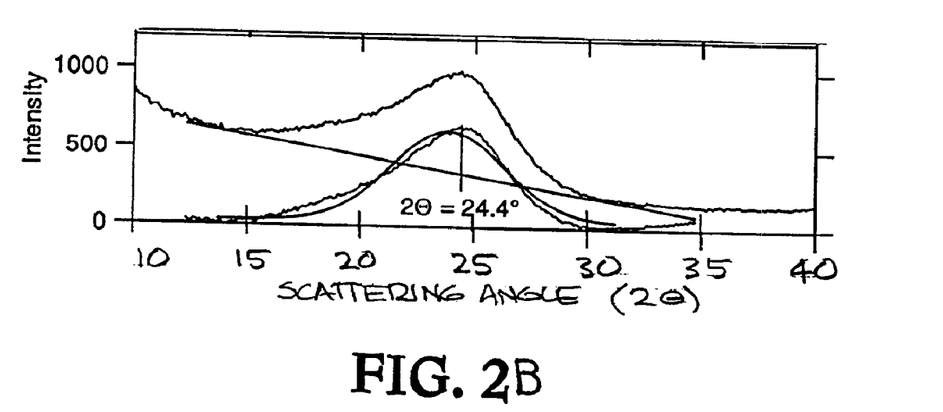
FIG. 2B is X-ray diffraction spectra of carbon sample B.
Figure 2C:
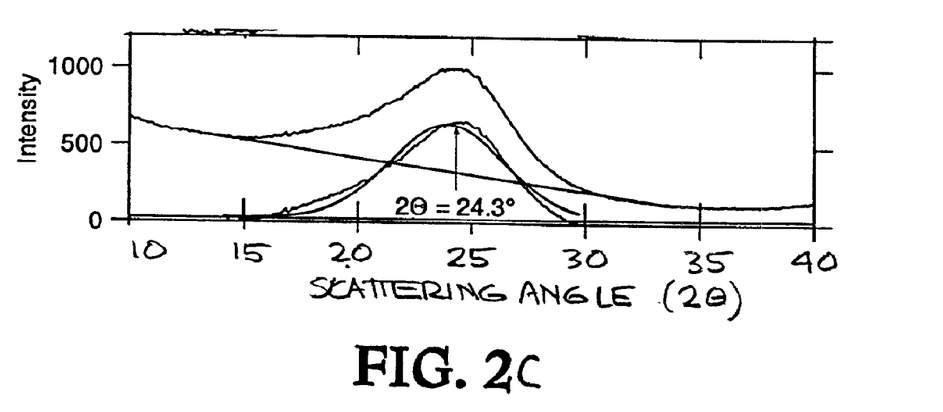
FIG. 2C is X-ray diffraction spectra of carbon sample C.
Figure 2D:
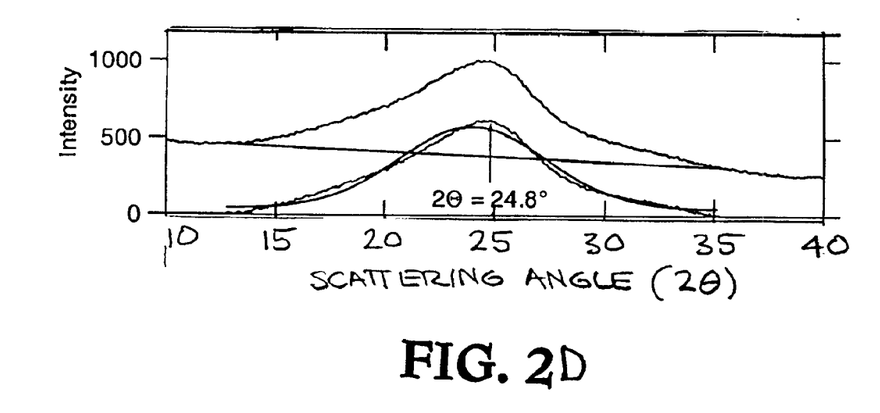
FIG. 2D is X-ray diffraction spectra of carbon sample D.
Figure 2E:
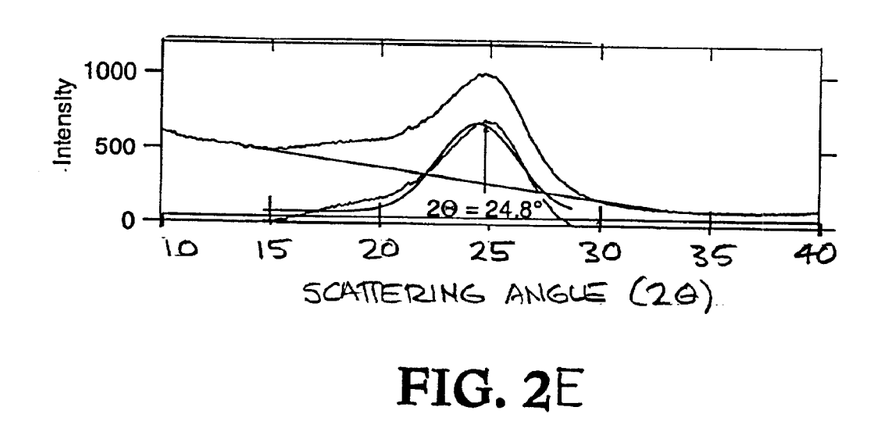
FIG. 2E is X-ray diffraction spectra of carbon sample E.
Figure 2F:
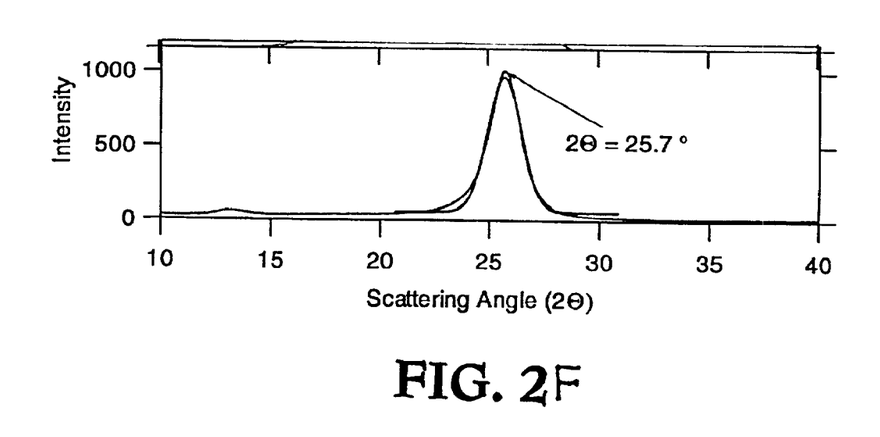
FIG. 2F is X-ray diffraction spectra of carbon sample F.

A high temperature, molten electrolyte electrochemical cell shown in FIG. 1 can operate as either a fuel cell or a battery. Fuel cells are characterized by having a fixed cell hardware that is capable of consuming fuel supplied to the cell from an external source; the rated power and energy capacity of fuel cells are, by definition, independent parameters. Batteries, in contrast, have their electrochemical reactants supplied in advanced of discharge and are limited in power and energy content simultaneously by the electrode surface area and the initial charge. The term slurry hereinafter refers to a mixture of carbon particles and electrolyte wherein the electrolyte is in the molten phase. The ratio of electrolyte to carbon particles is typically between 20% and 50%, but can be less than 20%. The electrolyte fraction of the slurry can flow under the influence of gravity regardless of the electrolyte/carbon ratio.

Non-Tilted Configuration

Referring to FIG. 1, the electrochemical cell 10 comprises a housing 12 that includes therein an anode compartment 14, a cathode compartment 16, and a porous ceramic separator 18 between the anode and cathode compartments. Anode compartment 14 is comprised of a slurry 20 containing a mixture of carbon fuel particles 22 and an electrolyte 24 and an anode current collector 26. Cathode compartment 16 is comprised of a cathode current collector 28, and an oxygen-containing gas 30. FIG. 1 shows the cell in a rectangular shape wherein the compartments of the cell are arranged vertically. Other shapes of the cell such as cylindrical and other orientations such as horizontal can perform equally well. The anode chamber can be positioned above the separator with the cathode chamber positioned below.

The housing 12 can be selected from any non-porous, non-conducting, inert material, such as, a non-reactive ceramic material, e.g., alumina. For large-scale commercial apparatuses, a metal alloy such as stainless steel can be used. To further improve the lifetime of the housing material, the alloy can be coated with a non-reactive material, such as a ceramic, an insulating metal oxide film, or a similar material. If metal housing is used for both the anode and cathode chambers, the two chambers must be separated by an electrical insulator.

Electrolyte 24 comprises metal carbonates. A single metal carbonate or a combination of metal carbonates may be used, in particular, mixtures of low melting alkali and/or alkaline earth carbonates. Commonly used carbonates are mixtures of $Li_2CO_3$, $K_2CO_3$, and/or $Na_2CO_3$. The eutectic mixture of 38% $Li_2CO_3$, 62% $K_2CO_3$ (molar ratio) as electrolyte 24 is effective.

A porous metal structure can serve as anode current collector 26. Anode current collector 26 can comprise a mesh, grid, felt, screen, sintered frit, or other similar electronically-conductive matrix that allows effective contact with and transport of the carbon fuel, salt and $CO_2$ product. In addition, anode current collector 26 comprises any metal or metalloid (e.g., graphite, highly graphityzed carbon or glassy carbon), that cannot melt at the operating temperature of the cell and is stable against corrosion in the molten carbonate salt. Graphite, highly graphityzed carbon or glassy carbon react very slowly in comparison to the carbon fuel materials. Metalloids such as those listed above are particularly effective if sulfur-bearing carbons are used as fuel. Ni felt, gold or platinum mesh or a metalloid foam or sponge can be employed as anode current collector 26. Cell 10 effectively performs at a ratio where the surface area of anode current collector 26 to the volume of slurry 20 is less than about 1 cm.

Porous ceramic separator 18 can comprise a cloth, felt, fabric, porous planar plate, porous tubular plate, or other similar structure. Porous ceramic separator 18 is constructed to be capable of transporting dissolved $CO_2$ 32 and carbonate ions 34 between anode compartment 14 and the cathode compartment 16. Separator 18 can comprise a non-reactive metal oxide such as $ZrO_2$, MgO, $LiAlO_2$, CaO, $Al_2O_3$, rare earth oxides, or other similar materials. $ZrO_2$ cloth of about 0.4–1.7 mm thickness or a porous $Al_2O_3$ crucible of about 1.5 mm wall thickness are effective as separator 18.

Cathode current collector 28 normally includes a metal that is in the form of a mesh, grid, felt, screen, sintered frit or other similar structure. Cathode current collector 28 is positioned in contact with an oxygen-containing gas 30 while concurrently in contact with the molten electrolyte 24. The combination of a molten electrolyte in the presence of oxygen creates a very corrosive environment and thus cathode current collector 28 can beneficially contain a corrosion resistant metal such as Ni, Au, Ag, Pt, Pd, Cu, Co, stainless steel, a corrosion resistant alloy and conductive oxides, such as NiO, lithiated nickel oxide, Li $CoO_2$, $LiFeO_2$ or other similar material, which support corrosion resistant catalysts for oxygen reduction.

A gas 30 containing oxygen and carbon dioxide or an oxygen-containing gas with carbon dioxide added is introduced to the cell through an inlet 36. The oxygen-containing gas 30 comprises air, but theoretically can be any inert gas that contains oxygen. Air performs well.

Table 1 compares various structural parameters and performances of six different carbon fuels. A is pyrolyzed acetylene, B, C and D are pyrolyzed oil products produced from a furnace black process, and E is pyrolyzed methane from a thermal black process. All are provided by Engineered Carbons Incorporated of Borger, Tex. F is petroleum coke "as received" from Superior Graphite Company of Chicago, Ill. No milling or further calcining steps were performed on it. Carbon particles can be extremely fine, e.g., less than 1 micron in size, or comprised of aggregates of large numbers of such fines. Primary particle size and aggregate size are determined by transmission electron microscopy, surface area is measured by BET ($N_2$) adsorption, nanostructural order is determined by X-ray diffraction, and chemical reactivity to air oxidation is determined by thermal gravimetric analysis. The d(002) represents the expanded lattice spacing and the $L_c$ refers to the short crystalline dimension perpendicular to basal plane.

TABLE 1

| Sample | d(002) spacing (nm) | $L_c$ (nm) | Surface Area ($m^2$/g) | Temp. at 80% Decomp. (° C.) | Current density at 0.8 V (mA/$cm^2$) | Temp. at Current density meas. (° C.) |
|---|---|---|---|---|---|---|
| A | 0.369 | 1.7 | 60 | 731 | 103 | 850 |
| B | 0.374 | 2.9 | 75 | 819 | 30 | 810 |
| C | 0.374 | 2.9 | 120 | 749 | 15 | 740 |
| D | 0.371 | 2.3 | 24 | 789 | 7 | 820 |
| E | 0.363 | 4.3 | 9 | 796 | 6 | 740 |
| F | 0.347 | 11.7 | 0.4 | 899 | 8 | 770 |

Table 1 shows that the carbon particles studied are turbostratic, that is, they exhibit small $L_c$ values and expanded d (002) spacing as compared to graphite at 0.3354 nm. Furthermore, high turbostraticity, as well as large surface area, correlate with electrochemical reactivity.

FIGS. 2A–2F show the X-ray diffraction spectra of the six carbon samples A through F. Another important feature of the carbon particles is whether or not they are "ash-free". Ash refers to any impurities present in the carbon particles. For instance, silica and metal oxides are examples of ash. Such impurities can be found in hydrocarbons before pyrolysis and are carried over into the carbon product of the pyrolysis. Carbon-containing samples that provide highly effective results are obtained from the pyrolysis of hydrocarbons that are substantially pure, i.e., impurities less than or equal to 5% by weight, and preferably less than 0.5%. The carbon particles produced from any group of hydrocarbons should be expected to have relatively high efficiencies in the electrochemical cells disclosed herein. Examples include, aliphatic hydrocarbons such as alkanes, alkenes and alkynes, aromatic hydrocarbons such as benzene and toluene, including multi-ring aromatic compounds such as naphthalene, and mixtures of the above named hydrocarbons such as natural gas. Pyrolysis products from substantially pure (impurities less than or equal to 5% by weight) petroleum coke and substantially pure (impurities less than or equal to 5% by weight) petroleum oil, cracking products or distillates can also be used effectively. It is preferable that carbon particles be of large specific surface area and should have been subjected to a minimum of thermal treatments that would result in graphitization or partial crystallization.

The cell shown in FIG. 1 may be operated at temperatures between 500° C. and 900° C. Greater ionic mobility and improved open circuit potential accompany increases in temperature. Ranges between 740° C. and 850° C. are effective. The cell can be assembled at room temperature each time an experiment is conducted.

Anode compartment 14 is formed by positioning slurry 20 (a mixture of electrolyte 24 and carbon fuel particles 22) in the bottom of cell 10. Carbon fuel particles 22 may be introduced to cell 10 through an inlet 38. Anode current collector 26 is positioned on top of slurry 20. Porous ceramic separator 18 is placed on top of anode current collector 26, and cathode current collector 28 is positioned on top of separator 18. Electrolyte 24 will become molten once the cell is heated to the operating temperature. Keeping a ratio of the surface area of anode current collector 26 to the volume of slurry 20 of less than about 1 cm can substantially reduce the loss of carbon to chemical corrosion by $CO_2$ that may be present in anode compartment 14. Such $CO_2$-caused corrosion, based upon the Boudouard reaction, may be represented by $C+CO_2=2CO$.

Separator 18 is saturated with electrolyte to avoid direct chemical reaction of the carbon fuel with oxygen from cathode compartment 16. Furthermore, separator 18 should be of sufficient thickness to prevent electrical shorting. It is desirable that separator 18 be thin enough to minimize resistive losses through the electrolyte. When saturated with electrolyte 24, separator 18 is dual functional, i.e., it is both ion-conducting and electron insulating. In a heated cell the ions of a molten electrolyte 24 can migrate from anode compartment 14 through separator 18. The separator 18 is saturated with molten electrolyte 24 allowing transport of $CO_2$ 32 by diffusion through the melt or effusion through open pores and carbonate ions 34 between anode compartment 14 and cathode compartment 16 by diffusion and migration through the melt phase.

The anode compartment generates an excess of $CO_2$, ⅔ of which are allowed to enter the cathode chamber to complete the cathode reactions. This transfer of $CO_2$ occurs by: (1) effusion through open pores 32, (2) diffusion through the liquid melt phase of the separator, and (3) by collection at an outlet port (not shown) and injection into the cathode inlet 36

Cathode current collector 28 is positioned on separator 18 such that molten electrolyte 24 is allowed to contact the surface on one side while the other side is concurrently in contact with oxygen-containing gas 30. Oxygen-containing gas 30 can be introduced to cell 10 through an inlet 36. As oxygen-containing gas 30 contacts cathode current collector 28, the cathodic half reaction $4e^-+O_2+2CO_2=2CO_3^{2-}$ occurs, carbonate ions 34 migrate through porous ceramic separator 18 coming in contact with anode current collector 26 where the anodic half reaction $C+2CO_3^{2-}=3CO_2+4e^-$ occurs and energy produced by the cell is collected by a load 40. $CO_2$ produced by the net reaction $C+O_2=CO_2$ can be removed from cell 10 through an outlet 42 or through an outlet from the anode chamber (not shown).

Rates as high as 100 mA/$cm^2$ at 0.8 V and 200 mA/$cm^2$ at 0.5 V can be achieved. Commercial systems can be designed in which several electrochemical cells may be placed in series or parallel. Uses include primary batteries, fuel batteries with replaceable carbon electrodes, and carbon/oxygen (air) fuel cells.

Applicants have tested six different carbon fuel samples in a small electrochemical cell suitable for laboratory testing. Several embodiments of the electrochemical cell were used. Differences between the embodiments include the chemical composition, structure, thickness and shape of the porous ceramic separator 18. Porous ceramic separators were either $ZrO_2$ cloth, thickness of 0.25–1.7 mm, or porous $Al_2O_3$ crucibles. The ceramic crucible separator has an inherently greater IR drop but is more rigid; the fabric separator is thin typically 0.25 mm, and has a proportionately lower IR drop. Thus higher power is obtained with the use of the thin fabric separator. Anode compartment 14 was typically loaded with 10–25 wt % carbon fuel particles 22 in electrolyte 24 typically $Li_2CO_3/K_2CO_3$ (46.6/53.4 wt %, 38/62 mole %) carbonate salt. Cathode compartment 16 was supplied with variable ratios and flow rates of air/$CO_2$. Anode current collectors 26 used were 1–20 $cm^2$ in size, made of nickel, gold or platinum mesh or foam. Cathode current collectors 28 used were 1–20 $cm^2$ in size and made of either Au or Pt mesh. Polarization curves were measured in the 700–900 degrees Celsius range, and power was also generated over intervals in excess of 12 hours at steady state.

Tilted Configuration

Figure 3:
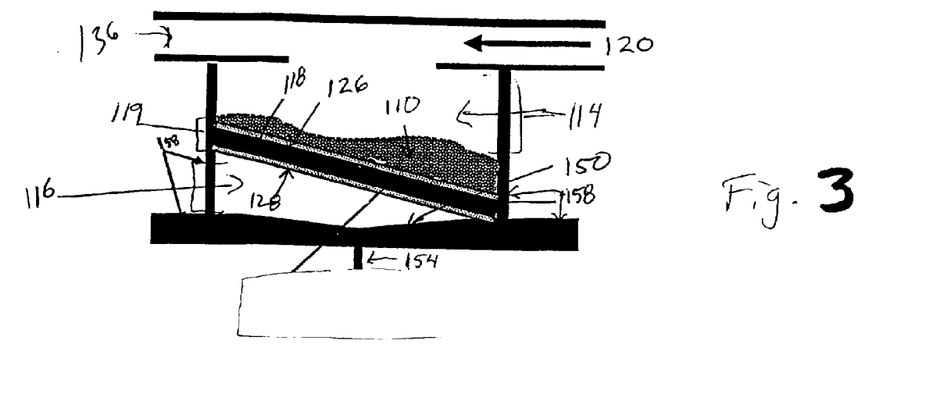
FIG. 3 is a schematic diagram of an embodiment of a fuel cell with a tilted configuration.
Figure 4:
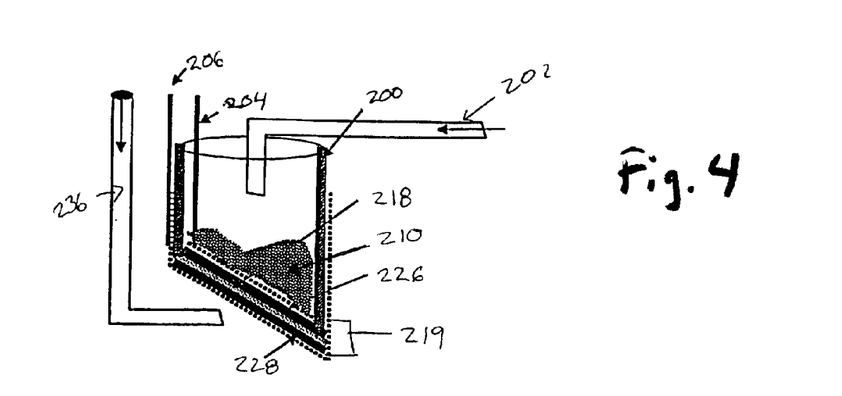
FIG. 4 is a schematic diagram of an embodiment of a fuel cell with a tilted configuration.

The tilted configuration embodiment of a high temperature, molten electrolyte electrochemical cell allows for continuous refueling of carbon fuel, means for removal of excess molten electrolyte and periodic flushing of the system by molten electrolyte to remove accumulated solid and dissolved impurities. Embodiments of a single cell assembly tilted configuration high temperature, molten electrolyte electrochemical cell are shown in FIGS. 3 and 4. These embodiments can operate as either fuel cells or batteries. The tilted configuration provides sufficient electrolyte to contact a plurality of carbon particles 110 and maintain the separator saturated with the molten salt, yet prevents the flooding or starving of the cathode current collector with respect to molten salt coverage. The tilted configuration can also provide for continuous refueling by entrainment of molten salt-wetted aggregates of carbon particles into the anode chamber, ultimately contacting the anode current collector. The tilted configuration allows excess molten salt entrained with carbon, i.e., carbon-entrained molten salt that exceeds the amount necessary to provide electrolyte contact between the carbon particles and the current collectors, to be automatically drained from the cell assembly, i.e., the anode, electrolyte, cathode portion of the fuel cell, into a sump. As the excess carbon-entrained molten salt is drained, it continuously sweeps undesirable constituents of the carbon fuel from the cell such as sulfur, nitrogen and soluble metals and ash.

Referring to FIG. 3, one embodiment of the tilted configuration comprises: a fill tube 136, an anode compartment 114, a cathode compartment 116, a base 150 draining into a sump 152 through a sump opening 154, a fill tube (not shown) connected to anode compartment 114, a plurality of solid blocks 158, and a cell assembly 119 containing a porous anode current collector 126, a porous ceramic separator 118, and a porous cathode current collector 128. Arrow 120 shows the direction of carbon fuel flow.

Cell assembly 119 is substantially planar and rectangular. Two parallel edges are oriented at an acute angle to the horizontal and supported between non-conductive solid blocks, which comprise ceramic or some other similar material. Carbon particles 110 become wetted with carbonate salt if they have oxide surface groups. Wetted particles tend to form a block at the bottom of the anode chamber, adjacent to the anode current collector. Excess molten salt entrained into the anode chamber that is absorbed in carbon particle aggregates tends to flow downwards through the pores of separator 118, through the pores of cathode 128, along the lower surface of cathode 128 to the lowest part of cell assembly 119, along base 150 through sump opening 154 to sump 152. The wetting affinity of the molten salt for the carbon particles, the porous separator and the porous electrodes causes the carbon, the separator and the electrodes to remain coated with a thin layer of molten salt which provides an ionic current path across the cell. Draining excess molten salt from the fuel cell to the sump prevents cathode 128 from becoming flooded with molten salt. Flooding of the cathode occurs when so much electrolyte covers the cathode that air is impeded from access to the cathode surface. A three-phase boundary comprised of the solid cathode, the liquid electrolyte and the oxygen gas from air are required to generate the reactions by which reduced oxygen may form and be transported as the carbonate ion away from the cathode and to the anode.

Draining excess molten salt from the fuel cell to the sump also cleanses the separator by allowing trace impurities to be removed continuously or intermittently from the molten salt through the continuously flowing excess molten salt from the anode compartment to the sump. Trace impurities include ash, sulfate, nitrogen compounds, dissolved metal ions, and other undesirable materials. Trace impurities have the potential of building up to levels that (1) reduce the molten salt's conductivity, (2) freeze the molten salt, or (3) corrode components of the cell assembly or fuel cell hardware.

The configuration shown in FIG. 3 is capable of indefinite scale-up in the length of the angled edge or in the length of the draining edge. Scale up is limited only by the support of the assembly and by electrical access to the electrode reaction sites. Stacking of several cell assemblies can also be accomplished and is described below.

Referring to FIG. 4, another embodiment of the single cell assembly tilted configuration sits inside a crucible (not shown) and comprises: a substantially vertical tube 200 made of alumina or other similar material cut at an acute angle to the horizontal such that one point on the assembly is at the lowest part of the cell assembly 219, a carbon feed tube 202, a gas fill tube 236, an anode lead 204, a cathode lead 206, and a cell assembly 219 containing a porous anode current collector 226, a porous ceramic separator 218, and a porous cathode current collector 228.

Molten electrolyte entrained with the carbon feed particle aggregates drains from the carbon mass collecting in the anode compartment, through the porous separator, and over the lower surface of the cathode to be discharged from the cell assembly along a line congruent with the lowest elevation edge of the assembly.

Bipolar Cell Assembly

A bipolar cell is one in which the direction of current flow is substantially perpendicular to the plane of the electrodes (anode and cathode) and is uniformly distributed over the electrodes. Bipolar cell assembly, as used hereinafter, refers to a cell assembly having a current density, i.e., Amperes per unit area of electrode, which is substantially uniform and perpendicular to the electrodes.

Figure 5:
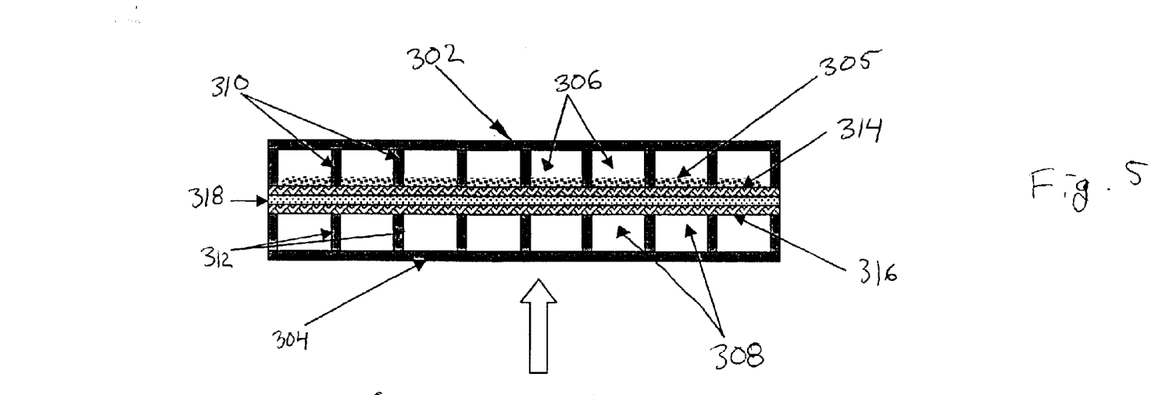
FIG. 5 is a cross-sectional top view of an embodiment of one electrochemical cell assembly that is connected in series in a bipolar configuration.
Figure 6:
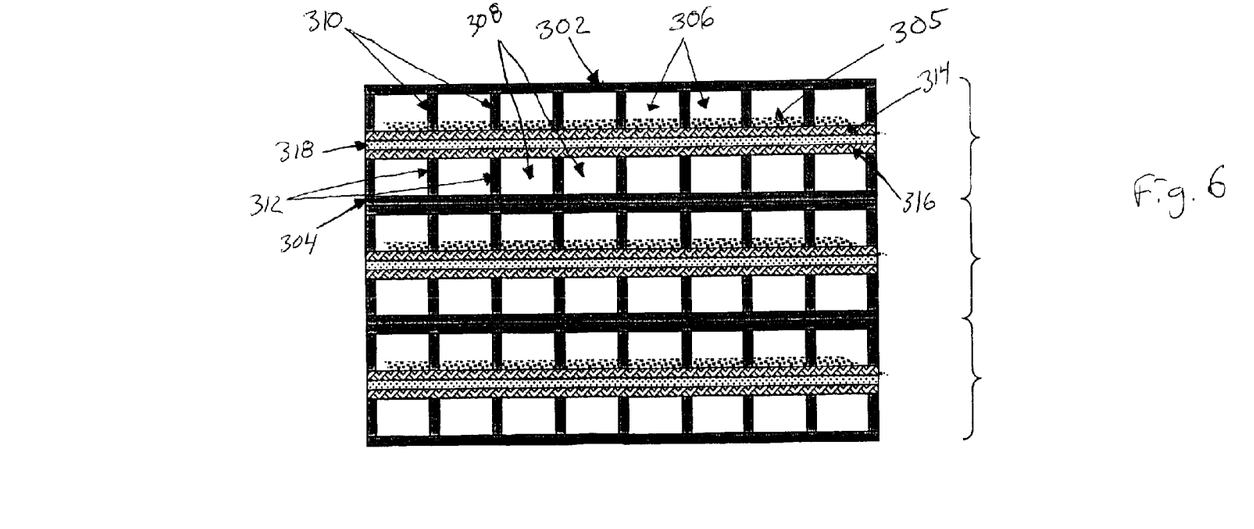
FIG. 6 is a cross-sectional top view of an embodiment of a plurality of electrochemical cell assemblies connected in series in a bipolar configuration.

FIG. 5 shows a cross-sectional view looking down from the top of one cell assembly configured as a bipolar cell. FIG. 6 shows a cross-sectional view from the top of an embodiment of a plurality of electrochemical cells configured into a bipolar array connected in series. Referring to FIGS. 5 and 6, the bipolar configuration 300 comprises a conducting bipolar anode plate 302, a conducting bipolar cathode plate 304, anode channels 306, cathode channels 308, anode ribs 310, cathode ribs 312, an anode current collector 314, a cathode current collector 316 and a porous ceramic separator 318.

Figure 7:
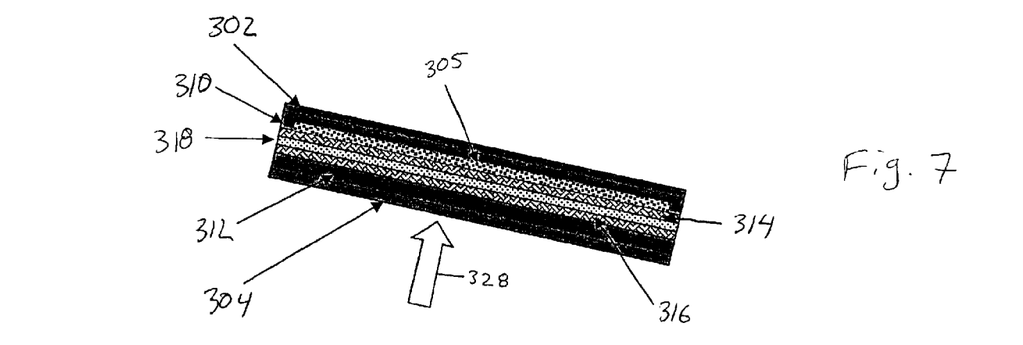
FIG. 7 is a cross-sectional side view of an embodiment of one electrochemical cell assembly that is connected in series in a bipolar configuration.
Figure 8:
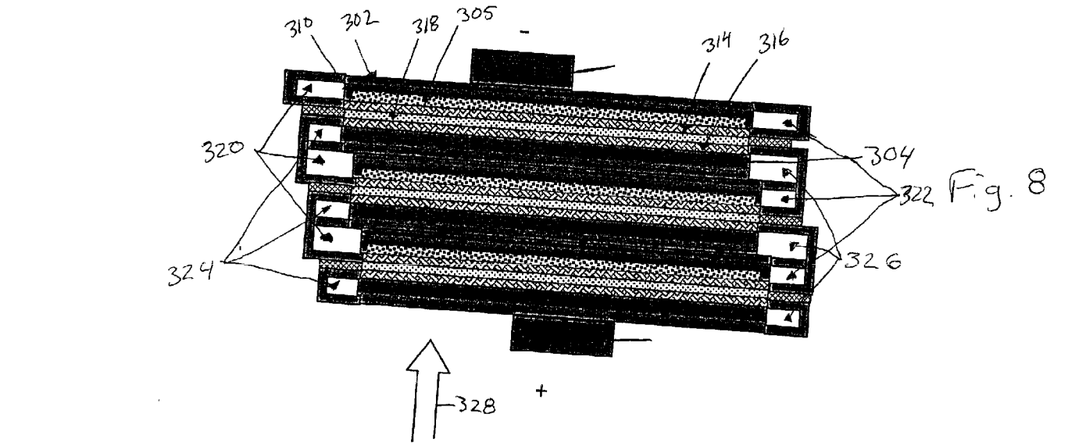
FIG. 8 is a cross-sectional side view of an embodiment of a plurality of electrochemical cell assemblies connected in series in a bipolar configuration.

FIG. 7 shows a cross-sectional view from the side of one cell assembly configured as a bipolar cell. FIG. 8 shows a cross-sectional view from the side of an embodiment of a plurality of electrochemical cells configured into a bipolar array connected in series. Referring to FIGS. 7 and 8, the anode plate of one cell assembly can be positioned in direct contact with the cathode plate of the adjacent cell assembly. Bipolar cells minimize the electrical resistance between one cell and others connected in electrical series.

Referring to FIGS. 5, 6, 7 and 8, anode plate 302 is attached to a plurality of parallel ribs 310 of conducting material (metal, metalloid or graphite). Spaces between the ribs, i.e., a plurality of anode channels 306, allow the refueling of the cell assembly with the slurry 305 (carbon/ electrolyte mixture) as well as the exhaust of carbon dioxide product. Referring to FIG. 8, anode inlet manifold 320 provides a means for fuel to enter the anode portion of the cell assembly and anode exhaust manifold 322 provides a means for anode reaction byproducts to exist the anode portion of the cell assembly. The cathode plate 304 is also connected to a series of conducting ribs to form a plurality of channels, i.e., cathode channels 308, allowing the flow of oxygen-containing cathode gas (e.g., air, or air/carbon-dioxide mixtures). Cathode inlet manifold 324 provides a means for a gas that contains both oxygen and carbon-dioxide to enter the cathode portion of the cell assembly and cathode exhaust manifold 326 provides a means for excess molten electrolyte and any unused portion of cathode gas to exit the cathode portion of the cell assembly. The plates and ribs, together referred to as a plate and rib assembly, comprise electronically-conducting materials such as metals. The edges of the ribs opposite the plates are electrically connected to the anode or cathode current collector. An electron-insulating separator, comprised of melt-saturated porous ceramic material, is sandwiched between the anode and cathode current collectors. Arrow 328 indicates the relative direction of current flow through the cell assembly or series of cell assemblies. A positive terminal 330 and negative terminal 332 depict one method to electrically connect the system.

The transfer plates, ribs, current collectors and separator are tilted downwards from an entry edge (perpendicular to the ribs) to a lower edge where the exhaust manifolds drain through a sump opening into a sump. The current passes from anode plate directly into the cathode plate of the adjacent cell, the current flow being substantially perpendicular to the surface of the plate.

The current collectors and separators are tilted downwards from the edge in which carbon fuel is introduced to the opposite, lower, edge, over which carbon dioxide is exhausted. The lower edge also provides a means for discharging into a sump the excess molten salt from the anode and cathode current collectors and separator as this electrolyte flows through the assembly under gravity. The edge over which anode fuel and electrolyte is introduced is at a higher elevation than the edge from which $CO_2$ and electrolyte is discharged. The ribs of the anode chamber are parallel to the direction of flow from the higher elevation edge to the lower elevation edge. The ribs of the cathode chamber can be parallel to, perpendicular to or at any angle between 90° and 180° to the ribs of the anode chamber. Thus, the direction of air flow can be parallel to or at any angle to the flow of carbon dioxide.

Air is allowed to flow through the cathode channels to meet power requirements. Typically air flow is adjusted to reach a ratio of oxygen flow that is about four times that required by the current. About a 1–2 psi pressure drop across the cell assembly including the manifolding is usually sufficient. Carbon dioxide is mixed with the incoming air flow in the ratio of two moles of carbon dioxide per one mole of oxygen. A source of carbon dioxide can be that exiting the exhaust of the anode flow channels. Mixing two of the three liters of carbon dioxide exiting the anode exhaust manifold with the incoming air flow is effective way to meet the requirements for the cathode reaction.

Fresh electrolyte can be added to the cell assembly along with the carbon particles. If an excess of fresh electrolyte is added, the amount in excess drains from the carbon particles and flows downwards to the anode exhaust manifold, through the manifold and then down into a sump. The electrolyte path between adjacent cell assemblies can be interrupted by any artifact that breaks-up the liquid path connecting the cell assemblies. Some examples include allowing the electrolyte from at least two adjacent cell assembly to drip independently into a common sump, allowing the electrolyte to form a frozen mass separating the molten electrolyte continuous with the separate cell assemblies, or providing for a very long path length for the electrolyte connecting adjacent cell assemblies. Such interruption of the electrolyte path prevents partial shorting by the electrical shunts that are formed by the electrolyte connecting one anode chamber to another.

During operation, the separator is continuously cleaned by the flux of salt from the cathode surface to the anode surface. This flux is a result of two factors. First the cathode consumes carbon dioxide along with oxygen to form carbonate:

$$2CO_2 + O_2 + 4e^- = 2CO_3^{2-}$$

while the anode generates an excess of carbon dioxide:

$$C + 2CO_3^{2-} = 3CO_2 + 4e^-$$

The net cell reaction is $C + O_2 = CO_2$. Since carbonate ion is generated at the cathode and consumed at the anode, in the steady state it must flux from the cathode surface to the anode surface as a molten salt. Second, the current is carried through the separator by the fastest moving ions, i.e., the Li and other alkali cations. As charge neutrality in the molten salt is always maintained, this means that the alkali carbonate is formed at the cathode and flows towards the anode at a molar rate equal to nearly twice the molar rate of carbon consumption. This constant movement of molten salt will protect the separator from accumulating impurities that have become entrained in the electrolyte.

To facilitate wetting of the carbon by the molten salt, the carbon particles may be ground together with salt in the ratio of 1:1 by weight at a temperature lower than the melting point of the salt mixture (i.e., typically up to about 450° C.). The grinding of the two materials (in for example a ball mill) causes the salt to fuse and absorb into and onto the surface of the carbon particle on the microscopic level. The "pre-salted carbon" will then wet when brought into contact with molten salt at the operating temperature of the cell assembly (i.e., about 750–800° C.).

Example of Bipolar Cell Assembly

A cell assembly can be fabricated with a 1 m×1 m×3 mm nickel anode plate, a 1 m×1 m×3 mm Inconel™ cathode plate, ribs having dimensions of about 10 mm high×2 mm wide×1 m long, an nickel porous anode current collector and a nickel porous cathode current collector each having dimensions of 2 mm thick×1 m wide×1 m long resulting in channels about 10 mm deep×20 mm wide×1 m long.

For the above cell assembly, a typical operating current density is 0.2 A/cm$^2$ (2 kA/m$^2$) with a rate of carbon consumption of about 0.53 g/cm$^2$ per day. The rate of carbon consumption equals the required rate of carbon injection (refueling) to the cell assembly. The refueling can be pursued in batches, e.g., 5.3 kg/cell assembly once a day over an interval of about 1–10 minutes.

An effective refueling mechanism used for the above cell assembly is to entrain the carbon particles in a gas flow comprising an inert or sparsely reactive gas, such as $CO_2$, $N_2$, or Ar. About 10% by volume is an effective concentration of particles in gas. For example, to refuel 5.3 kg of carbon per day requires a flow of gas of approximately 26.5 liters per cell assembly per day. The gas flow rate for a 1 minute refueling period is about 26.5 liters per minute, whereas the gas flow rate for a 10 minute refueling period is about 2.65 liters per minute.

An oxygen-containing gas, e.g., air, is allowed to flow through the cathode channels at a rate sufficient to meet the power requirement of the cell assembly. Gas flow velocity can be adjusted so that the oxygen flow will be 4 times that required by the current. This assumes that excess $O_2$ will be available at the cathode. Carbon dioxide is mixed with the incoming oxygen-containing gas in the ratio of 2 moles $CO_2$ per 1 mole of $O_2$. The source of the $CO_2$ can be that exiting from the anode exhaust manifold. If air is used as the oxygen-containing gas, which is about 20% oxygen, the air can be mixed with CO2 to produce a mixture with the following composition: 4/7 $N_2$; 1/7 $O_2$; 2/7 $CO_2$. Thus, 2 of every 3 liters of $CO_2$ exiting the anode exhaust manifold is mixed with the incoming air flow in order to meet the requirements of the cathode reaction. Argon or any other non-reactive gas may replace the nitrogen found in air. Any ratio of non-reactive gas may exist provided the $CO_2/O_2$ ratio remains in the range of 0.5 to 4, with a ratio of 2 being preferred. For the above cell assembly, the current density is 0.2 A/cm$^2$ and 1 m$^2$ per cell assembly, so the total oxygen flow rate is 0.93 liters per second (8 times that required by the current of 0.2 A/cm$^2$). Air which contains 1/7 $O_2$ has a total flow rate of 7×0.93 liters/second, which equals 14 standard cubic feet per minute (scfm). The resulting pressure drop across the cell assembly is typically 1–2 psi including the manifolding.

The typical throughput for the cell assembly above per day of operation, operating at 80% efficiency, is 1.6 kW, 38.6 kWh, 5.3 kg carbon with a waste heat generation at a rate of 20% total carbon consumption corresponding to 400 W continuous thermal. Assuming the carbon entrains 0.1% by weight "ash", then in approximately 6 months, a total of about 1.0 kg of ash will accumulate in the 1 m$^2$ cell. The ash can be flushed out by stopping the carbon feed and feeding in pure electrolyte (salt) in an amount of 1–5 kg/cell assembly.

For the above cell assembly having a porous ceramic separator of a 0.1 cm thickness and a porosity of 50%, the molten electrolyte flows at a rate of 0.0037 moles/hr per cm$^2$. For a molten salt represented by the formula $Na_2CO_3$ (formula weight of 106 g/mole) having a density of 2 g/cm$^3$, the flow rate is 0.2 cm$^3$ of salt/cm$^2$ of separator per hour. The electrolyte is exchanged at the rate of about 1 volume per every 15 minutes.

Examples Using the Non-Tilted Configuration

Electrochemical reactivity of sample B was tested in the cell configuration described below. Experimental data for electrochemical reactivity of sample B is shown by the solid diamonds and triangles in FIG. 9. The cell which was heated in a tubular furnace at about 810° C. for about 6 hours comprises: a solid alumina outer crucible with a cap containing holes for an alumina tube that introduced a mixture of $CO_2/O_2$ in the ratio of about 3:1 and an alumina tube containing a thermocouple; about a 1.5 mm thick porous alumina inner crucible (separator) with a cap containing holes for an alumina tube that introduced argon, a gold $O_2/CO_2$ reference electrode, and a thermocouple; a cathode comprising about 12 cm$^2$ platinum mesh wrapped around near the base of the crucible and attached to platinum wire; an anode comprising about 21.4 cm$^2$ platinum mesh attached to platinum wire pressed into the inside of the porous crucible and connected to a lead made of a piece of wire. A carbon/carbonate salt mixture (about 6 g carbon powder, about 20 g carbonate salts in a molar ratio of about 38% $Li_2CO_3$, 62% $K_2CO_3$) was loaded into the central compartment of the porous crucible and about 20 g of carbonate salts were added to the outer crucible to promote wetting of the porous crucible.

Electrochemical reactivity of sample B was tested in the cell configuration described below. Experimental data for electrochemical reactivity of sample B is shown by the solid diamonds and triangles in FIG. 9. The cell which was heated in a tubular furnace at a temperature between about 810° C. and about 850° C. for about 6 hours comprises: a small solid alumina crucible loaded with a carbon/carbonate salt mixture (about 1.25 g carbon powder, about 5 g carbonate salts in a molar ratio of about 38% $Li_2CO_3$, 62% $K_2CO_3$), a flat circular nickel mesh anode connected to a wire lead, a zirconia fabric separator with a thickness between about 0.38 mm and about 0.76 mm, and a gold mesh cathode connected to a gold strip lead. The gold cathode was pressed into the surface of the separator. A mixture of air and $CO_2$ in the ratio of about 2.5 to 1 was introduced through an alumina tube to the surface of the cathode, and thermocouples were used to measure the temperature in the vicinity of the cathode.

Electrochemical reactivity of sample A was tested twice in the cell configuration described below. Experimental data for electrochemical reactivity of sample A measured in the first test using the cell configuration described below is shown in FIG. 5 and identified as 7/11 voltage ($ZrO_2$ separator). The cell which was heated in a tubular furnace at about 850° C. for about 48 hours comprises: a small solid alumina crucible loaded with a carbon/carbonate salt mixture (about 1.25 g carbon powder, about 5 g carbonate salts in a molar ratio of about 38% $Li_2CO_3$, 62% $K_2CO_3$), a flat circular nickel mesh anode connected to a wire lead, a zirconia fabric separator with a thickness between about 0.38 mm and about 0.76 mm, and a gold mesh cathode connected to a gold strip lead. The gold cathode was pressed into the surface of the separator. Air was introduced through an alumina tube to the surface of the cathode, and thermocouples were used to measure the temperature in the vicinity of the cathode.

Figure 10:
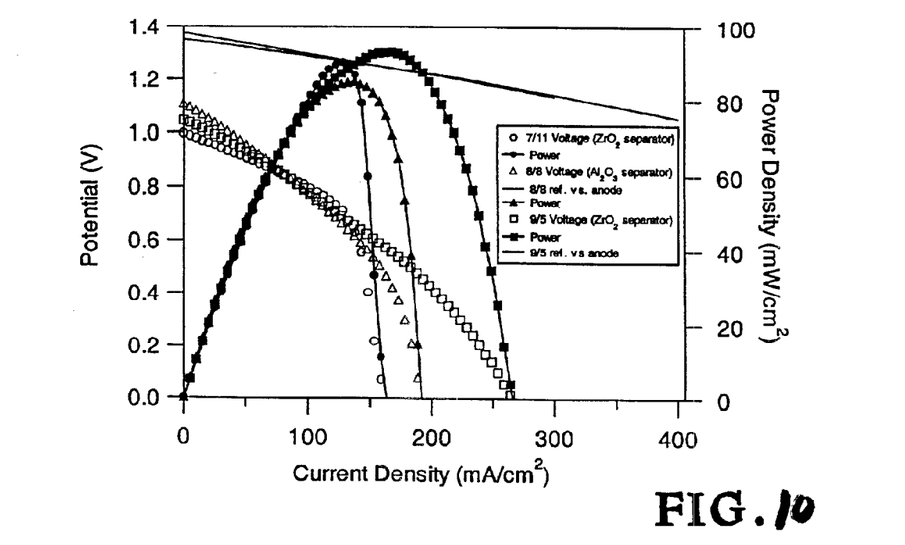
FIG. 10 shows the results of one experiment with sample A in one cell embodiment and two experiments with sample A in a second cell embodiment.

Experimental data for electrochemical reactivity of sample A measured in the second test using the cell configuration described below is shown in FIG. 10 and identified as 9/5 voltage ($ZrO_2$ separator). The cell which was heated in a tubular furnace at about 850° C. for about 5 hours comprises: a small solid alumina crucible loaded with a carbon/carbonate salt mixture (about 1.75 g carbon powder, about 5 g carbonate salts in a molar ratio of about 38% $Li_2CO_3$, 62% $K_2CO_3$), a flat circular nickel mesh anode connected to a wire lead, a zirconia fabric separator with a thickness between about 0.38 mm and about 0.76 mm, and a gold mesh cathode connected to a gold strip lead. The gold cathode was pressed into the surface of the separator. Air was introduced through an alumina tube to the surface of the cathode, and thermocouples were used to measure the temperature in the vicinity of the cathode.

Electrochemical reactivity of sample A was tested in the cell configuration described below. Experimental data for electrochemical reactivity of sample A using the cell configuration described below is shown in FIG. 10 and identified as 8/8 voltage ($Al_2O_3$ separator). The cell which was heated in a tubular furnace at about 850° C. for about 8 hours comprises: a solid alumina outer crucible with a cap containing holes for an alumina tube that introduced air and an alumina tube containing a thermocouple; about a 1.5 mm thick porous alumina inner crucible (separator) with a cap containing holes for an alumina tube that introduced argon, a gold $O_2/CO_2$ reference electrode, and a thermocouple; a cathode comprising about 12 cm$^2$ platinum mesh wrapped around near the base of the crucible and attached to platinum wire; an anode comprising about 21.4 cm$^2$ platinum mesh attached to platinum wire pressed into the inside of the porous crucible and connected to a lead made of a piece of wire. A carbon/carbonate salt mixture (about 5 g carbon powder, about 20 g carbonate salts in a molar ratio of about 38% $Li_2CO_3$, 62% $K_2CO_3$) was loaded into the central compartment of the porous crucible and about 20 g of carbonate salts were added to the outer crucible to promote wetting of the porous crucible.

Results of the three tests of electrochemical reactivity of sample A illustrated in FIG. 10 show that a cell voltage of 0.8 V at 100 mA/cm$^2$ is reproducible, while behavior at higher current densities varies depending on the cell configuration used.

Figure 9:
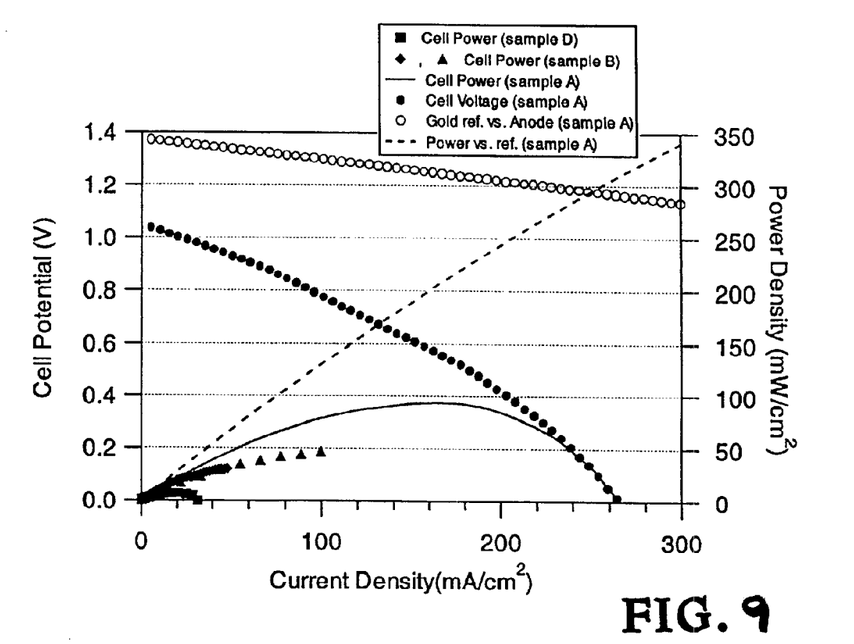
FIG. 9 is a plot of power density and cell potential versus current density showing the cell power of carbon sample B in two different cell configurations.

FIG. 9 shows power density curves, anode vs. cathode, for B and E reach very low peak powers. Cell polarization for A shows 100 mA/cm$^2$ at 0.8 V, and a peak power near 100 mW/cm$^2$, while reference vs. anode for A shows even less polarization, and power vs. reference for A suggests potential power generation at >300 mW/cm$^2$ with a cathode of sufficiently low resistance.

Figure 11A:
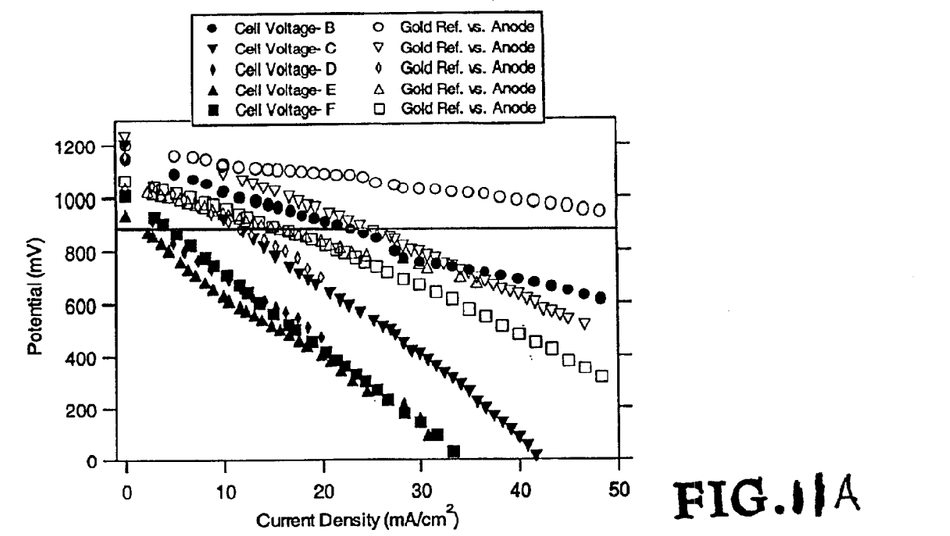
FIG. 11A shows cell and half-cell polarization.

FIG. 11A shows cell polarization (anode vs. cathode) of samples B, C, D, E, and F, as well as polarization vs. a gold reference electrode (half-cell data).

Figure 11B:
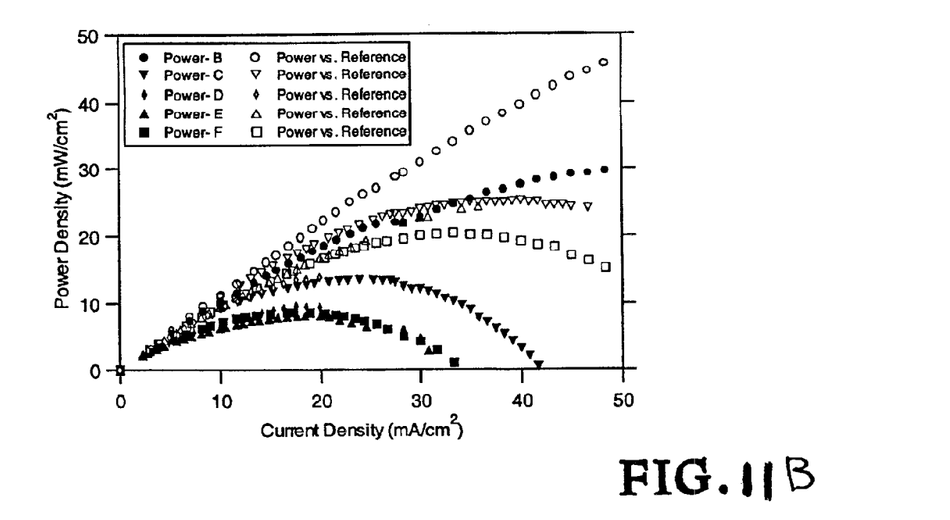
FIG. 11B shows cell and half-cell power.

FIG. 11B shows cell power (anode vs. cathode) and power that could be generated if cathode polarization matched that of the reference.

FIG. 10 shows the cell power measured for sample A in two different cell configurations, thus illustrating that the two straight cell configurations used to collect data for the six carbon samples analyzed are comparable.

Examples Using the Tilted Configuration

The tilted configuration, schematic shown in FIG. 4, was heated in a tubular furnace in the range of 750–850° C. for about 48 hours. The tilted cell comprises a solid alumina outer crucible with a cap containing holes for an alumina tube that introduced air and $CO_2$ in the ratio of 5/2, respectively and an alumina tube containing a thermocouple; the inner angled alumina cell containing disk-like electrodes, with zirconia cloth between them as the separator. The angled compartment had a cap containing holes for an alumina tube that introduced argon, and a thermocouple; anode and cathode comprising about 5 cm$^2$ made of nickel foam and attached to stainless steel wire. A carbon/carbonate salt mixture (about 5 g carbon powder, about 20 g carbonate salts in a molar ratio of about 38% $Li_2CO_3$, 62% $K_2CO_3$) was loaded into the angled cell.

Figure 12:
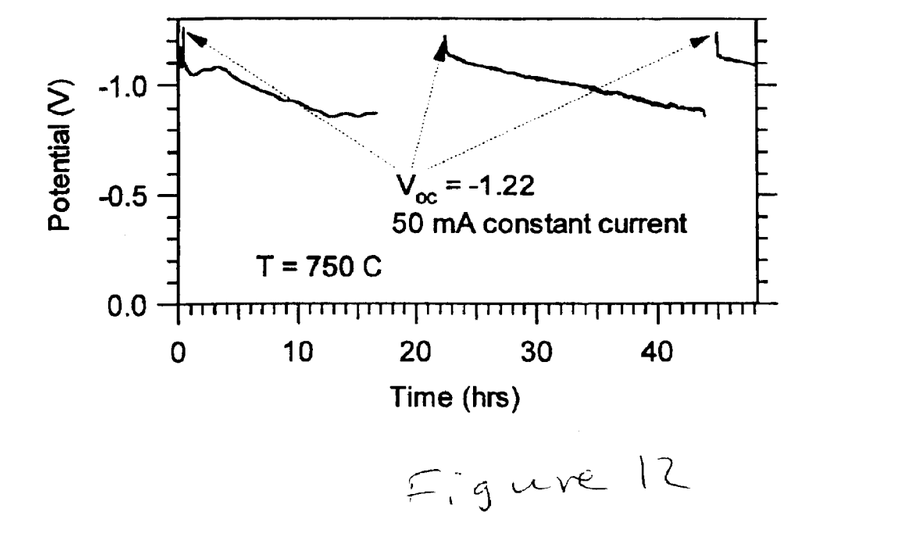
FIG. 12 is a graph of the voltage versus time for a carbon sample run in a fuel cell with a tilted configuration.

FIG. 12 shows that under constant current (fixed load) a reasonably stable voltage may be maintained over operation on the scale of tens of hours.

Figure 13:
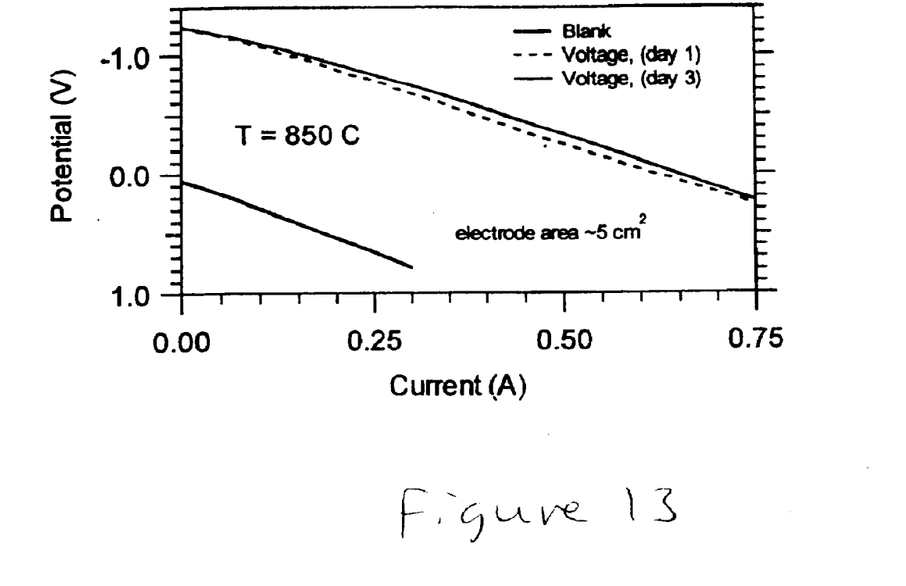
FIG. 13 is a polarization curve for a carbon sample run in a fuel cell system with a tilted configuration.

FIG. 13 shows long-term behavior of the fuel cell by comparing initial polarization curves with a curve taken three days later in the same cell under identical conditions. This data demonstrates that current densities of 50 mA/cm$^2$ may be achieved at 80% efficiency (0.8 V), and that the cell components and performance are stable over several days operation.

What is claimed is:

1. An apparatus comprising:
   an anode current collector;
   a cathode current collector;
   a porous ceramic separator, wherein said separator is sandwiched between said cathode current collector and said anode current collector and said anode current collector is at a higher elevation than said cathode current collector;
   an anode plate and rib assembly comprising a plate and a plurality of ribs, wherein said anode plate and rib assembly is positioned such that said ribs are electrically connected to said anode current collector to form a plurality of anode channels;
   a cathode plate and rib assembly comprising a plate and a plurality of ribs, wherein said cathode plate and rib assembly is positioned such that said ribs are electrically connected to said cathode current collector to form a plurality of cathode channels;
   a means for entry to said anode channels of a plurality of particles, wherein said particles consist essentially of carbon, electrolyte, or mixtures thereof;
   a means for entry of a gas containing both oxygen and carbon-dioxide to said cathode channels;
   a means for exit of carbon dioxide gas and excess molten electrolyte from said anode channels; and
   a means for exit of gaseous byproducts and excess molten electrolyte from said cathode channels, wherein said cell assembly is substantially planar and rectangular and tilted at an acute angle to the horizontal in a configuration such that said means of entry are positioned at a higher elevation than said means of exit and that said anode plate and rib assembly is positioned at a higher elevation than said cathode plate and rib assembly.

2. The apparatus recited in claim 1, wherein the acute angle to the horizontal is between about 15 degrees and about 60 degrees.

3. The apparatus recited in claim 1, wherein said carbon/electrolyte mixture is entrained in a carrier gas.

4. The apparatus recited in claim 3, wherein said carrier gas is an inert gas, an unreactive gas or a sparsely reactive gas.

5. The apparatus recited in claim 4, wherein said inert gas is helium, neon or argon.

6. The apparatus recited in claim 4, wherein said unreactive gas is nitrogen.

7. The apparatus recited in claim 4, wherein said sparsely reactive gas is carbon dioxide or carbon monoxide.

8. The apparatus recited in claim 1, further comprising a means for flowing said oxygen-containing gas through said cathode channels.

9. The apparatus recited in claim 8, wherein said means for flowing said oxygen-containing gas through said cathode channels is pressure-driven convection or thermally-driven convection.

10. The apparatus recited in claim 1, wherein said porous ceramic separator is saturated with molten electrolyte during operation.

11. The apparatus recited in claim 1, said porous ceramic separator is a non-reactive metal oxide selected from the group consisting of $ZrO_2$, MgO, $LiAlO_2$, CaO, $Al_2O_3$, rare earth oxides, and combinations thereof.

12. The apparatus recited in claim 11, wherein the non-reactive metal oxide is constructed in the form of a cloth, felt, fabric, porous planar plate, or porous tubular plate.

13. The apparatus recited in claim 1, wherein the anode plate, the cathode plate, and the ribs comprise a metal, metal alloy, metalloid or graphite.

14. The apparatus recited in claim 1, wherein gas containing oxygen and carbon dioxide comprises air mixed with carbon dioxide such that the ratio of carbon-dioxide to oxygen has a ratio ranging from 0.5 to 4.

15. The apparatus recited in claim 1, wherein the electrolyte comprises metal carbonates.

16. The apparatus recited in claim 15, wherein the metal carbonates comprise a mixture of one or more components selected from the group consisting of $Li_2CO_3$, $K_2CO_3$, and $Na_2CO_3$.

17. The apparatus recited in claim 15, wherein the metal carbonates comprise the mole ratio of 38% $Li_2CO_3$/62% $K_2CO_3$.

18. The apparatus recited in claim 1, wherein the anode current collector is a porous metal structure that will not melt at the operating temperature of the cell or a porous metalloid structure that will not melt at the operating temperature of the cell.

19. The apparatus recited in claim 1, wherein the anode current collector comprises a grid, felt, screen, foam, mesh, sponge or sintered frit.

20. The apparatus recited in claim 1, wherein the cathode current collector comprises a metal selected from the group consisting of Ni, Au, Ag, Pt, Pd, Cu, Co, alloys thereof, and Fe alloys thereof.

21. The apparatus recited in claim 1, wherein said cathode current collector is a grid, felt, screen, foam, mesh or sintered fit.

22. An apparatus comprising:
at least two bipolar, high temperature, molten electrolyte cell assemblies, wherein each cell assembly comprises:
a porous ceramic separator;
a cathode current collector;
an anode current collector, wherein said separator is sandwiched between said cathode current collector and said anode current collector and said anode current collector is at a higher elevation than said cathode current collector;
a cathode plate and rib assembly comprising a plate and a plurality of ribs, wherein said cathode plate and rib assembly is positioned such that said ribs are in contact with said cathode current collector and form a plurality of cathode channels;
an anode plate and rib assembly comprising a plate and a plurality of ribs, wherein said anode plate and rib assembly is positioned such that said ribs are in contact with said anode current collector and form a plurality of anode channels;
a means for entry to said anode channels of a plurality of particles, wherein said particles consist essentially of carbon, electrolyte, or mixtures thereof;
a means for entry of a gas containing oxygen and carbon-dioxide to said cathode channels;
a means for exit of carbon dioxide gas and excess molten electrolyte from said anode channels; and
a means for exit of gaseous byproducts and excess molten salt from said cathode channels, wherein said cell assembly is substantially planar and rectangular and tilted at an acute angle to the horizontal in a configuration such that said means of entry are positioned at a higher elevation than said means of exit; and
wherein said cell assemblies are connected in electrical series.

23. An apparatus comprising:
(1) an anode compartment comprising (a) a plurality of anode plate and rib assemblies each comprising a plate and a plurality of ribs, (b) a plurality of anode channels, (c) a plurality of anode current collectors, wherein each anode plate and rib assembly is positioned such that said ribs are electrically connected to one anode current collector to form anode channels, (d) a means for entry to said anode channels of a plurality of particles, wherein said particles consist essentially of carbon, electrolyte, or mixtures thereof, and (e) a means for exit of carbon dioxide gas and excess molten electrolyte from said anode channels;
(2) a cathode compartment comprising (a) a plurality of cathode plate and rib assemblies each comprising a plate and a plurality of ribs, (b) a plurality of cathode channels, (c) a plurality of cathode current collectors, wherein each cathode plate and rib assembly is positioned such that said ribs are electrically connected to one cathode current collector to form cathode channels, (d) a means for entry of a gas containing oxygen and carbon-dioxide to said cathode channels, and (e) a means for exit of gaseous byproducts from said cathode channels;
(3) a plurality of porous ceramic separators, wherein each separator is sandwiched between one of said cathode current collectors and one of said anode current collectors to form a bipolar cell assembly, wherein said cell assemblies are connected in series and tilted at an acute angle to the horizontal such that said means of entry are at a higher elevation than said means of exit and said anode compartment is at a higher elevation than said cathode compartment;
(4) an anode inlet manifold providing the means for entry of said plurality of particles to said anode channels;
(5) an anode exhaust manifold providing the means for exit of said carbon dioxide and excess molten electrolyte from said anode channels, wherein said anode exhaust manifold communicates with a sump;
(6) a cathode inlet manifold providing the means for entry of said gas containing oxygen and carbon-dioxide to said cathode channels;
(7) a cathode exhaust manifold providing the means for exit of said gaseous byproducts and excess molten electrolyte from said cathode channels; and
(8) a sump to collect the excess molten electrolyte.

24. The apparatus recited in claim 23, wherein said mixture of carbon and electrolyte consist essentially of carbon particles ground together with solid electrolyte particles to form an intimate mixture.

25. An apparatus comprising:
an anode current collector;
a cathode current collector;
a porous ceramic separator, wherein said separator is sandwiched between said cathode current collector and said anode current collector and said anode current collector is at a higher elevation than said cathode current collector;
an anode plate and rib assembly comprising a plate and a plurality of ribs, wherein said anode plate and rib assembly is positioned such that said ribs are electrically connected to said anode current collector to form a plurality of anode channels; and
a cathode plate and rib assembly comprising a plate and a plurality of ribs, wherein said cathode plate and rib assembly is positioned such that said ribs are electrically connected to said cathode current collector to form a plurality of cathode channels;
wherein said cell assembly is substantially planar and rectangular and tilted at an acute angle to the horizontal in a configuration such that said anode plate and rib assembly is positioned at a higher elevation than said cathode plate and rib assembly.

26. The apparatus recited in claim 25, wherein the acute angle to the horizontal is between about 15 degrees and about 60 degrees.

27. The apparatus recited in claim 25, wherein said carbon/electrolyte mixture is entrained in a carrier gas.

28. The apparatus recited in claim 27, wherein said carrier gas is an inert gas, an unreactive gas or a sparsely reactive gas.

29. The apparatus recited in claim 28, wherein said inert gas is helium, neon or argon.

30. The apparatus recited in claim 28, wherein said unreactive gas is nitrogen.

31. The apparatus recited in claim 28, wherein said sparsely reactive gas is carbon dioxide or carbon monoxide.

* * * * *